US009929765B2

(12) United States Patent
Williams et al.

(10) Patent No.: US 9,929,765 B2
(45) Date of Patent: Mar. 27, 2018

(54) ROTATABLE WRIST MOUNTED MOBILE DEVICE CASE

(71) Applicant: Whelan & Williams Industries Inc., Plano, TX (US)

(72) Inventors: Christopher Williams, Carrollton, TX (US); Sean Humke, Keller, TX (US); Waide Ian Marshall, Wylie, TX (US)

( * ) Notice: Subject to any disclaimer, the term of this patent is extended or adjusted under 35 U.S.C. 154(b) by 0 days.

(21) Appl. No.: 15/073,771

(22) Filed: Mar. 18, 2016

(65) Prior Publication Data

US 2016/0277551 A1    Sep. 22, 2016

Related U.S. Application Data

(60) Provisional application No. 62/134,002, filed on Mar. 17, 2015.

(51) Int. Cl.
*A45F 5/00* (2006.01)
*H04B 1/3888* (2015.01)
*H04B 1/3827* (2015.01)

(52) U.S. Cl.
CPC ............. *H04B 1/3888* (2013.01); *A45F 5/00* (2013.01); *H04B 1/385* (2013.01); *A45F 2005/008* (2013.01); *A45F 2200/0516* (2013.01); *A45F 2200/0525* (2013.01); *H04B 2001/3855* (2013.01); *H04B 2001/3861* (2013.01)

(58) Field of Classification Search
CPC ........ A45F 2005/008; A45F 2200/0516; A45F 2200/0525; H04B 1/385; H04B 1/3888
See application file for complete search history.

(56) References Cited

U.S. PATENT DOCUMENTS 8,328,055 B1 * 12/2012 Snyder ...................... A45F 5/00
224/197

\* cited by examiner

*Primary Examiner* — Nam Huynh
(74) *Attorney, Agent, or Firm* — Lightfoot & Alford PLLC (57) ABSTRACT

A mobile device case has a case configured to receive a mobile device and a wrist system configured for attachment to a wrist of a user. The case is selectively removable from the wrist system.

5 Claims, 7 Drawing Sheets

ROTATABLE WRIST MOUNTED MOBILE DEVICE CASE

CROSS-REFERENCE TO RELATED APPLICATION(S) AND CLAIM OF PRIORITY

The present application claims priority to U.S. Provisional Patent Application Ser. No. 62/134,002 filed 17 Mar. 2015 entitled "Rotatable Wrist Mounted Mobile Device Case". The content of the above-identified patent document is incorporated herein by reference.

TECHNICAL FIELD

The present application relates to systems and methods for retaining and supporting mobile devices.

BACKGROUND

Some mobile devices, such as, but not limited to, smartphones, can be useful to a user during user activities that require the user to not hold the mobile device in the user's hands. While some systems allow strapping a mobile device to an upper arm of a user, the existing systems are not configured well for allowing viewing of a screen of the mobile device and/or manipulating the mobile device to provide user inputs to the mobile device.

BRIEF DESCRIPTION OF THE DRAWINGS

For a more complete understanding of this disclosure, reference is now made to the following description, taken in conjunction with the accompanying drawings, in which.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION

Figure 1:
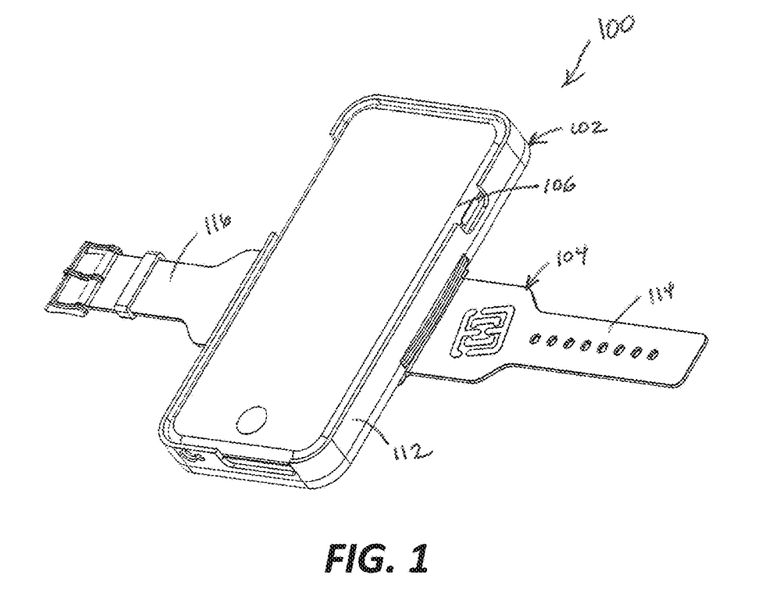
FIG. 1 is an oblique view of a mobile device case system (MDCS) according to the present application and shown retaining a mobile device.

Referring now to FIG. 1, a mobile device case system (MDCS) 100 according to an embodiment of this disclosure is shown. The MDCS 100 generally comprises a case 102 that is selectively and movably attached to a wrist system 104. The case 102 is configured to receive and selectively retain a mobile device 106 such as, but not limited to, a smartphone. While FIG. 1 shows the MDCS 100 with a mobile device 106 installed into the MDCS 100 and retained by the MDCS 100, FIGS. 2-11 show the MDCS 100 without illustrating any associated mobile device 106.

Figure 2:
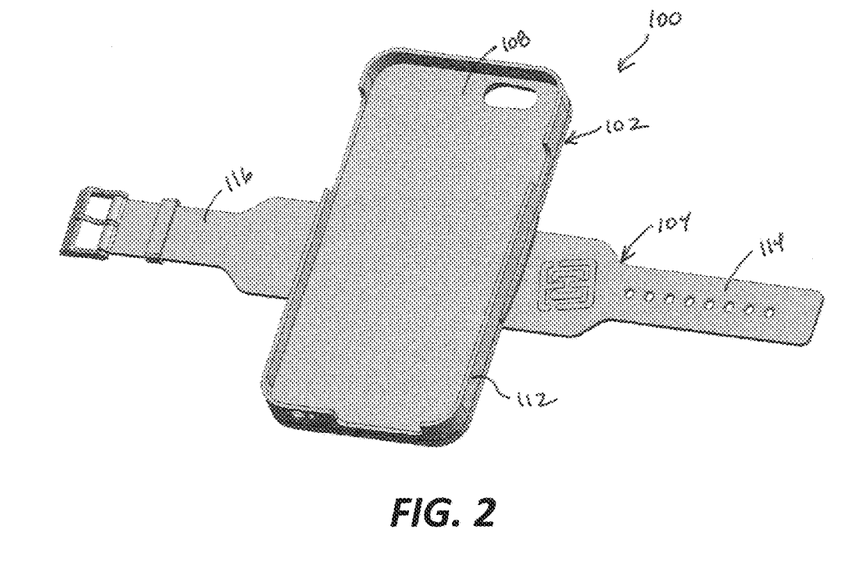
FIG. 2 is an oblique view of the MDCS of FIG. 1 and shown without a retained mobile device.
Figure 3:
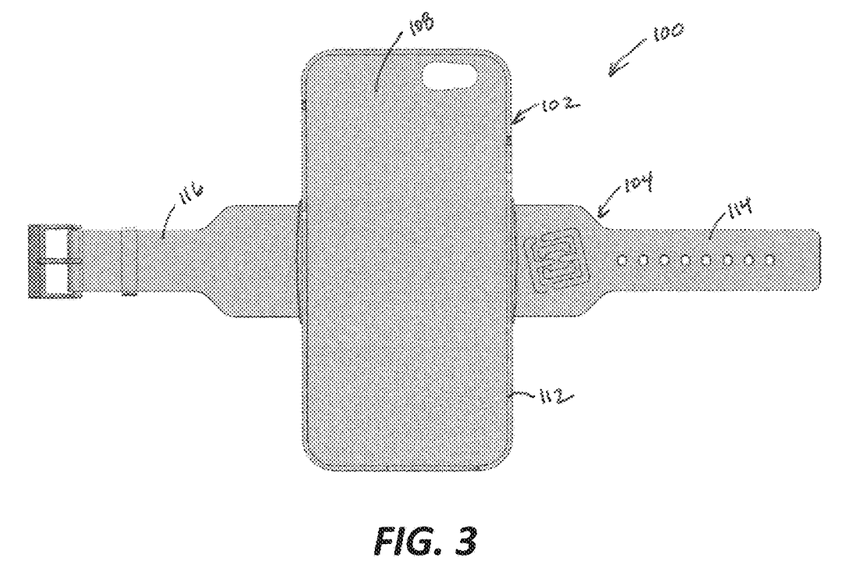
FIG. 3 is an orthogonal front view of the MDCS of FIG. 1.
Figure 4:
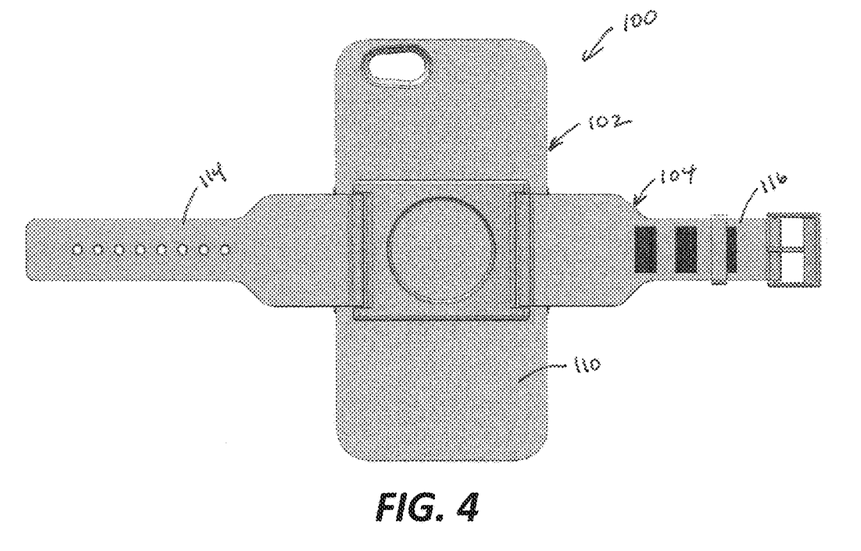
FIG. 4 is an orthogonal back view of the MDCS of FIG. 1.

Referring now to FIGS. 2-4, the MDCS 100 is shown without a mobile device 106 installed, thereby exposing for view an front plate 108 of the case 102. The front plate 108 generally serves as a backstop and/or floor for when a mobile device 106 is received within the case 102. In other words, a back of a mobile device 106 can abut the front plate 108 when the mobile device 106 is installed in the case 102. The case 102 further comprises a rear plate 110. As will be explained in further detail below, mechanisms for selectively attaching the case 102 to the wrist system 104 are housed within the case 102 between the front plate 108 and the rear plate 110. The case 102 further comprises a sidewall 112 the generally extends forward from the front plate 108 and serves to provide retention forces to installed mobile device 106. The sidewall 112 may comprise cutouts and/or notches to allow convenient access to buttons, speakers, lights and or other features of a mobile device 106. The cutouts and/or notches may further be provided to allow the fingers of a user to grasp a mobile device 106 and remove the mobile device 106 from the case 102. In some embodiments, the case 102 may comprise an aperture extending through both the front plate 108 and rear plate 110 to allow a camera of a mobile device to receive light therethrough.

Figure 5:
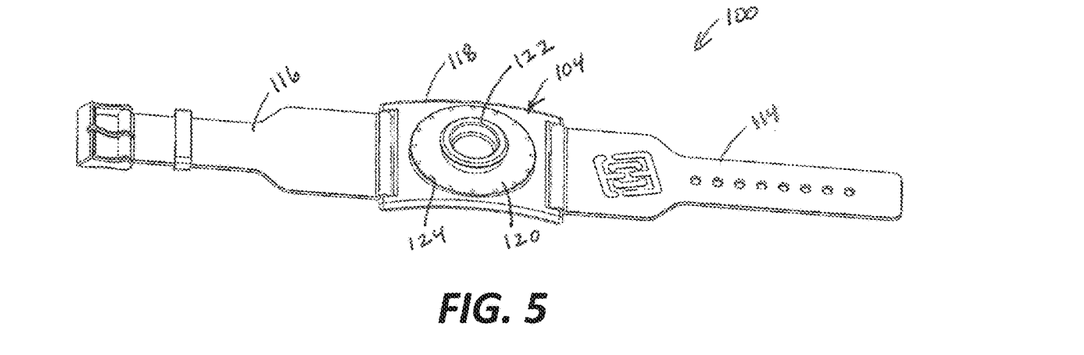
FIG. 5 is an oblique view of a wrist system of the MDCS of FIG. 1.
Figure 6:
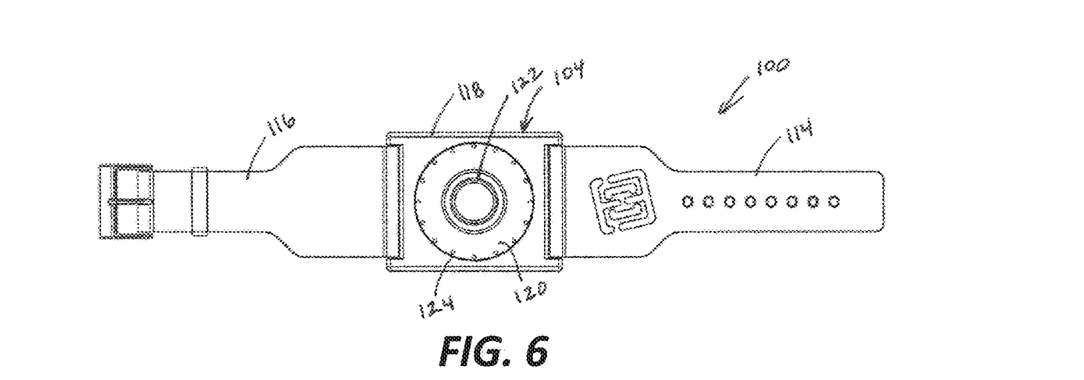
FIG. 6 is an orthogonal front view of the wrist system of FIG. 5.
Figure 7:
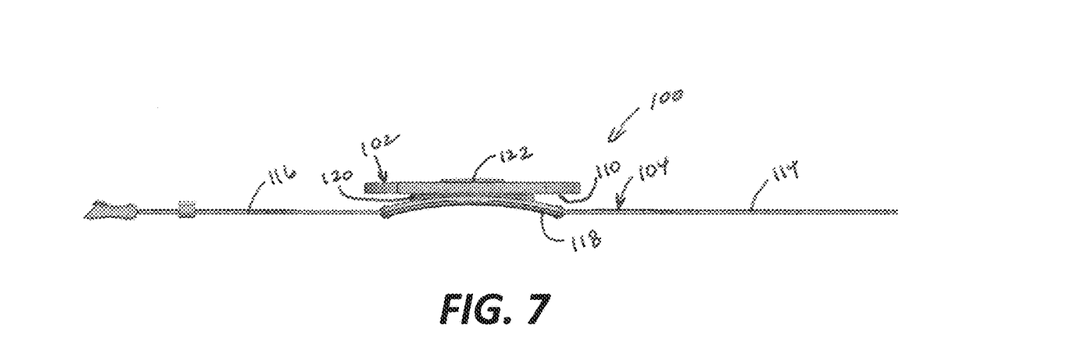
FIG. 7 is an orthogonal side view of the wrist system of FIG. 5.
Figure 8:
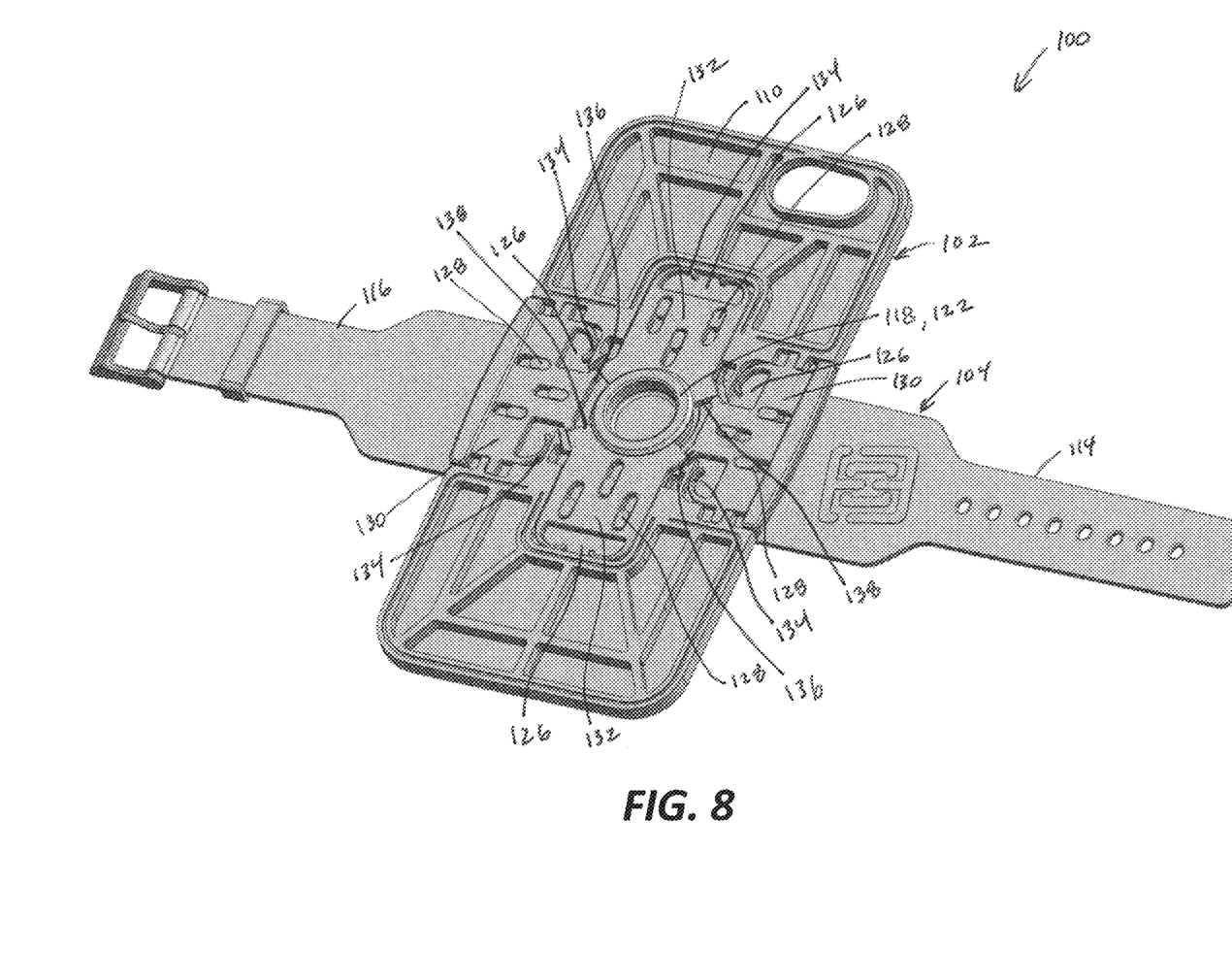
FIG. 8 is an oblique cutaway view of the MDCS of FIG. 1.
Figure 9:
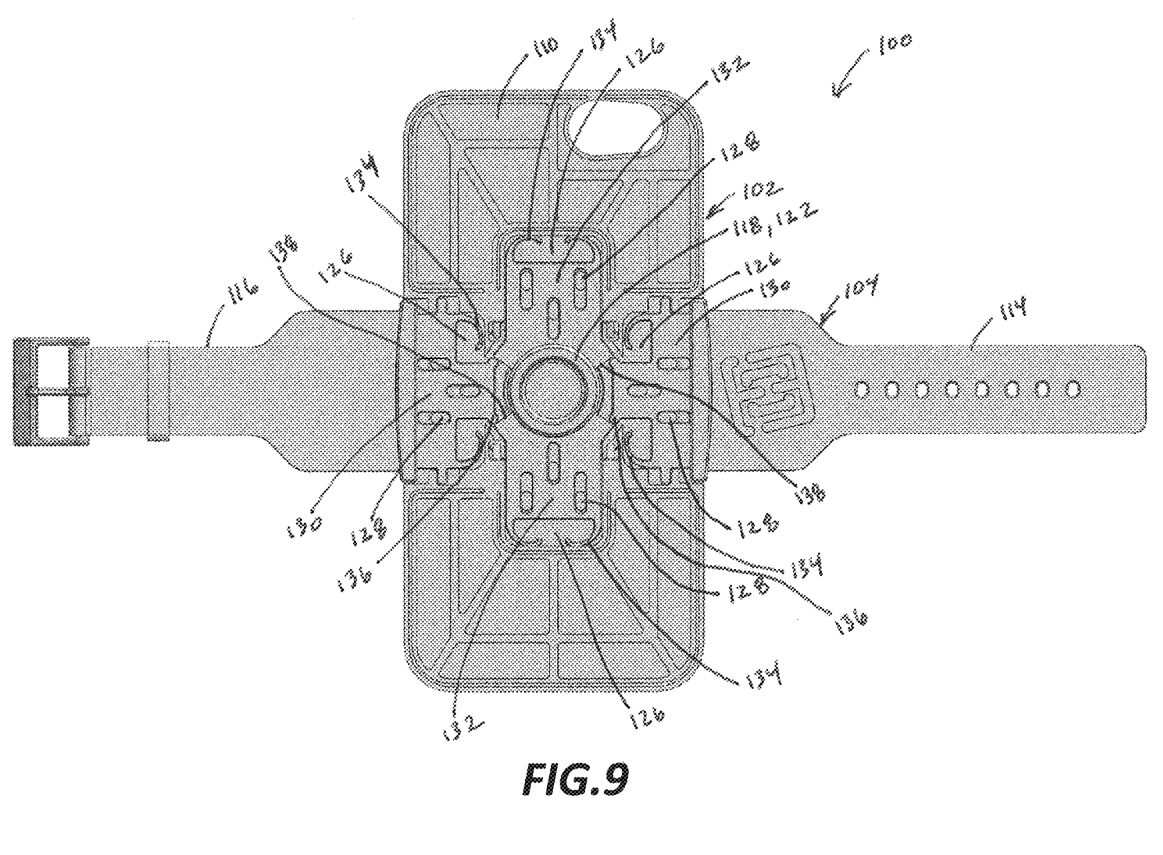
FIG. 9 is an orthogonal cutaway front view of the MDCS of FIG. 1.
Figure 10:
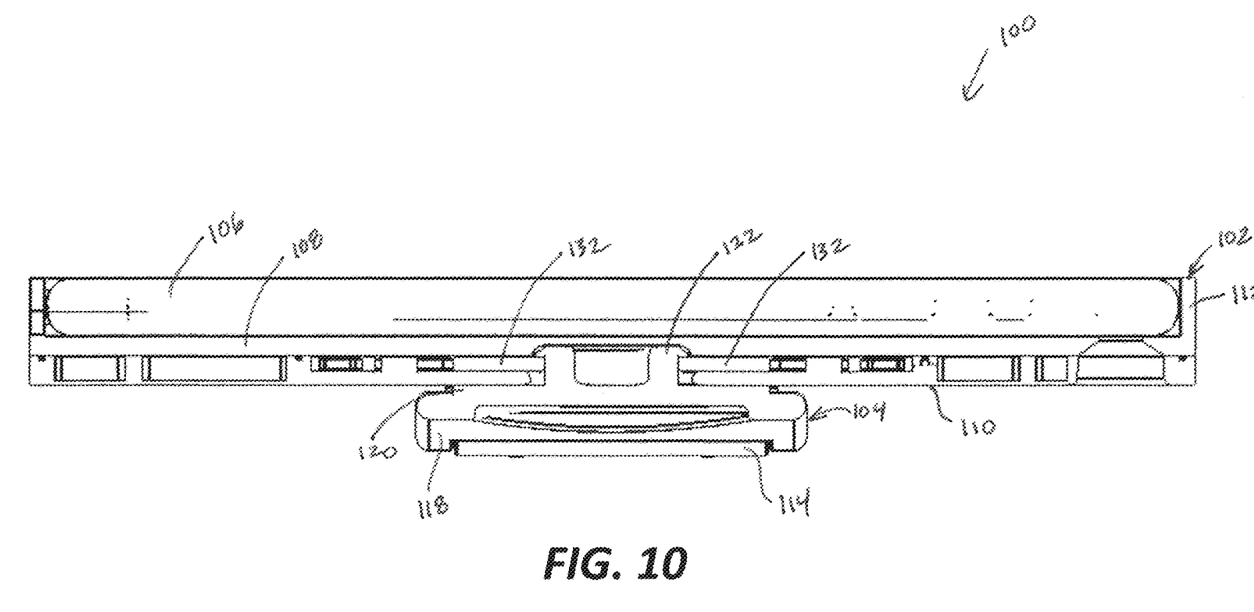
FIG. 10 is an orthogonal cutaway side view of the MDCS of FIG. 1.
Figure 11:
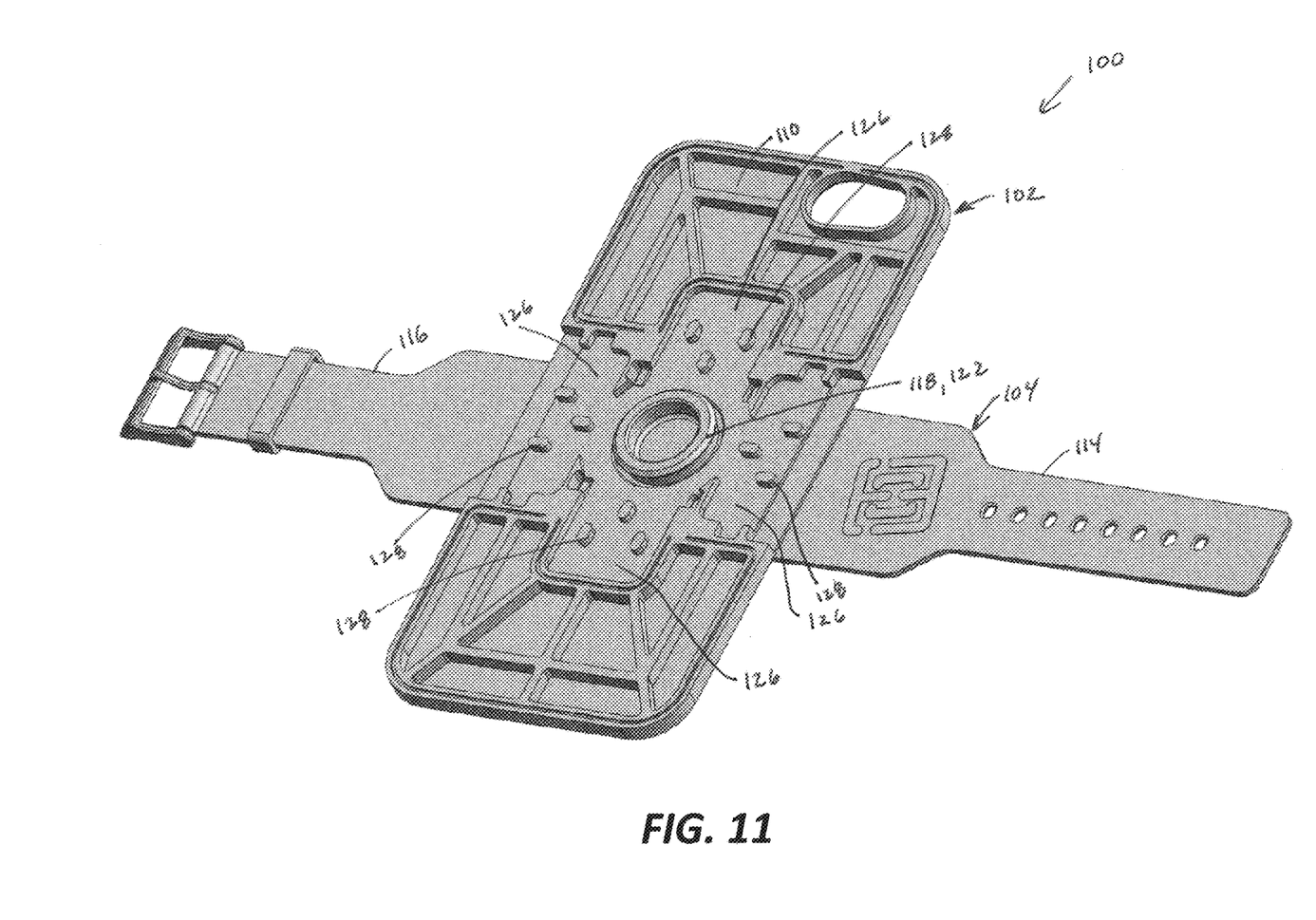
FIG. 11 is an oblique cutaway view of the MDCS of FIG. 1 with bias components and lock components not shown.

Referring now to FIGS. 5-7, the wrist system 104 is shown in isolation and without the associated case 102. The wrist system 104 generally comprises an apertured strap 114, a buckle strap 116, and a case mount 118 disposed therebetween. Most generally, the joinder between each of the apertured strap 114 and the buckle strap 116 is substantially similar to the manner in which a common wristwatch is constructed, namely, with a jointed construction between each of the apertured strap 114 and the case mount 118 and the buckle strap 116 and the case mount 118. The case mount 118 further comprises a rotary base 120 configured to serve as a backstop for abutment to the rear plate 110 when the case 102 is attached to the wrist system 104. The case mount 118 further comprises a retention knuckle 122 that extends forward beyond the rotary base 120. The retention knuckle 122 generally comprises a shaft portion and a head portion positioned at a forward end of the shaft portion. The head portion generally comprises a ring of material that extends radially beyond the radial extents of the shaft portion. The head portion, as explained in further detail below, serves as a stop against which components internal to the case 102 can be selectively captured between the head portion and the rotary base 120. The rotary base 120 further comprises raised bumps 124 configured to interact with recesses and/or apertures formed on a rearward portion of the case 102 so that rotation of the case 102 about a central axis of the retention knuckle 122 relative to the case mount 118 can be graduated and/or stopped by varying resistance to such rotation as a function of the interaction between the raised bumps 124 and the case 102.

Referring now to FIGS. 8-11, the case 102 is shown attached to the wrist system 104, but with the front plate 108 and sidewall 112 remove to show interior features and components of the case 102. The case 102 generally comprises a front-rear thickness sufficient to provide recesses 126 configured to house biased movable components. The case 102 further comprises posts 128 extending in a front-rear direction and the posts 128 serve to secure the biased movable components. In this embodiment, the biased movable components comprise biased buttons 130 and biased lock plates 132. The buttons 130 are configured to extend slightly beyond a remainder of the case 102 on each of a left side and a right side of the case 102. The buttons 130 are generally biased in a left-right direction so that squeezing and/or pinching the buttons 130 toward each other causes resisted movement toward the central axis of the retention knuckle 122. In this embodiment, the biasing force is supplied by tails 134. The tails 134 comprise material extensions comprising cross-sectional areas and shape profiles configured to allow elastic deformation of the tails 134 in response to the above-mentioned pinching action. In this embodiment, buttons 130 further comprise tabs 136 configured for contact with ramps 138 of the lock plates 132. In this embodiment, in response to the above-describe pinching of the buttons 130, the tabs 136 press against the biased ramps 138 and force the lock plates 132 away from the central axis of the retention knuckle 122. With sufficient displacement of the lock plates 132 away from the central axis of the retention knuckle 122, the lock plates 132 provide a temporary passage to allow insertion and/or removal of the retention knuckle 122 into and/or from an interior space of the case 102.

In operation, the MDCS 100 may be utilized with a mobile device 106 by first inserting a mobile device 106 into the case 102. Next the case 102 may be positioned relative to the wrist system 104 so that the retention knuckle 122 of the wrist system 104 is aligned with a central axis of an opening formed in the rear plate 110 of the case 102 that allows entry/exit of the retention knuckle 122 into/from an interior portion of the case 102. In some embodiments, a tapered portion of the head portion of the retention knuckle 122 may interface lock plates 132 and in response to sufficient force applied, the lock plates 132 may displace away from the central axis of the retention knuckle 122 until the lock plates 132 are located adjacent the shaft portion of the retention knuckle 122. Once the lock plates 132 have passed the head portion, the lock plates 132 may return toward a position nearer the central axis of the retention knuckle 122 so that the lock plates 132 selectively prevent removal of the retention knuckle 122 from the interior of the case 102. With the case 102 attached to the wrist system 104, a user may rotate the case 102 about the central axis of the retention knuckle 122. In some cases, a user may graduate the rotation based on tactile feedback and/or a prescribed and/or varying resistance to rotation that results from the interaction of the raised bumps 124 and the case 102. To remove the case 102 from the wrist system 104, a user may again displace the buttons 130 toward the central axis of the retention knuckle 122 until a sufficient clearance and/or passage is created to allow removal of the retention knuckle 122 from the interior of the case 102.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A mobile device case, comprising:
   a case configured to receive a mobile device; and
   a wrist system configured for attachment to a wrist of a user;
   wherein the case is selectively removable from the wrist system;
   wherein a portion of the wrist system is selectively received within the case;
   wherein a knuckle of the wrist system is selectively received within the case;
   wherein the knuckle is received through an aperture of a rear plate of the case;
   wherein the knuckle comprises a head portion and a shaft portion and wherein the head portion is disposed on an end of the shaft portion;
   wherein the shaft portion is disposed between the head portion and a rotary base of the wrist system;
   wherein the case comprises a front plate against which a mobile device can be abutted against when the mobile device is carried by the case;
   wherein the case comprises a rear plate offset from the front plate
   wherein the case comprises a recess between the rear plate and the front plate;
   wherein the case comprises a movable lock plate disposed in the recess;
   wherein the movable lock plate is biased in a first direction toward a space within the case into which the knuckle can be received;
   wherein the movable lock plate comprises a tail configured to bias the lock plate;
   wherein the case comprises a movable button configured to selectively move the lock plate;
   wherein the button is biased away from the space within the case into which the knuckle can be received;
   wherein the button comprises a tab configured to contact a ramp of the lock plate;
   wherein the button is movable in directions substantially orthogonal relative to the first direction; and
   wherein the lock plate is moved in a second direction opposite the first direction in response to the button being moved toward the space within the case into which the knuckle can be received.

2. The mobile device case of claim 1, wherein the lock plate is restricted to movement in the first direction and the second direction by being captured between the front plate and the rear plate and by receiving a post within a complementary slot of the lock plate.

3. The mobile device case of claim 1, wherein the button is restricted to movement in directions orthogonal to the first direction by being captured between the front plate and the rear plate and by receiving a post within a complementary slot of the button.

4. The mobile device case of claim 1, wherein the wrist system is attached to the case when the lock plate is captured between the head portion of the knuckle and the rear plate.

5. The mobile device case of claim 1, wherein but for the aperture configured to receive the knuckle, a rear side of the rear plate comprises a substantially planar profile.

\* \* \* \* \*